United States Patent
Kubler et al.

(10) Patent No.: US 10,860,706 B2
(45) Date of Patent: Dec. 8, 2020

(54) SECURE UNATTENDED NETWORK AUTHENTICATION

(71) Applicant: Hand Held Products, Inc., Fort Mill, SC (US)

(72) Inventors: Joseph J. Kubler, Lafayette, CO (US); Arthur Millican, Granite Falls, WA (US); Jonathan D. Fletcher, Tekoa, WA (US)

(73) Assignee: Hand Held Products, Inc., Fort Mill, SC (US)

( * ) Notice: Subject to any disclaimer, the term of this patent is extended or adjusted under 35 U.S.C. 154(b) by 85 days.

(21) Appl. No.: 15/830,641

(22) Filed: Dec. 4, 2017

(65) Prior Publication Data
US 2018/0101675 A1    Apr. 12, 2018

Related U.S. Application Data

(63) Continuation of application No. 14/695,923, filed on Apr. 24, 2015, now abandoned.

(51) Int. Cl.
*H04L 29/06* (2006.01)
*G06F 21/44* (2013.01)
*G06F 21/42* (2013.01)

(52) U.S. Cl.
CPC .............. *G06F 21/44* (2013.01); *G06F 21/42* (2013.01); *H04L 63/0853* (2013.01); *H04L 63/18* (2013.01)

(58) Field of Classification Search
CPC ..... G06F 21/44; G06F 21/42; H04L 63/0853; H04L 63/18
See application file for complete search history.

(56) References Cited

U.S. PATENT DOCUMENTS

| | | | |
|---|---|---|---|
| 6,832,725 B2 | 12/2004 | Gardiner et al. | |
| 6,976,062 B1 | 12/2005 | Denby et al. | |
| 7,128,266 B2 | 10/2006 | Zhu et al. | |
| 7,159,783 B2 | 1/2007 | Walczyk et al. | |
| 7,270,275 B1 * | 9/2007 | Moreland ............ | H01H 13/702 200/61.93 |
| 7,413,127 B2 | 8/2008 | Ehrhart et al. | |
| 7,726,575 B2 | 6/2010 | Wang et al. | |
| 8,065,724 B2 | 11/2011 | Waltenberg et al. | |

(Continued)

FOREIGN PATENT DOCUMENTS

| | | |
|---|---|---|
| WO | 2013/173985 A1 | 11/2013 |
| WO | 2013163789 A1 | 11/2013 |
| WO | 2014/110495 A1 | 7/2014 |

OTHER PUBLICATIONS

NPL Search (Google Scholar) (Year: 2020).*

(Continued)

*Primary Examiner* — Mahfuzur Rahman
*Assistant Examiner* — Richard W Cruz-Franqui
(74) *Attorney, Agent, or Firm* — Alston & Bird LLP

(57) ABSTRACT

A system for secure network access by unattended devices is described. The system describes how unattended devices that have encrypted data at rest and/or require secure authentication to an open network may procure the access credentials for authentication and/or decryption. With these access credentials, then the unattended devices may exchange information with and/or receive updates from servers on the network.

19 Claims, 10 Drawing Sheets

(56) References Cited

U.S. PATENT DOCUMENTS

| | | |
|---|---|---|
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,504,505 B2 * | 8/2013 | Mintah .................. G06Q 10/06 706/46 |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,736,909 B2 | 5/2014 | Sato et al. |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |

(56) References Cited

U.S. PATENT DOCUMENTS

| | | |
|---|---|---|
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,596 B1 | 7/2016 | Todeschini |
| D762,604 S | 8/2016 | Fitch et al. |
| D762,647 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,488,986 B1 | 11/2016 | Solanki |
| 9,489,782 B2 | 11/2016 | Payne et al. |
| 9,490,540 B1 | 11/2016 | Davies et al. |

(56) References Cited

U.S. PATENT DOCUMENTS

| | | |
|---|---|---|
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| D790,553 S | 6/2017 | Fitch et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 2002/0063035 A1* | 5/2002 | Blad .................. G07D 11/30 194/350 |
| 2005/0109841 A1* | 5/2005 | Ryan .................. G06Q 20/10 235/380 |
| 2005/0246470 A1* | 11/2005 | Brenner ............... G06F 1/1632 710/303 |
| 2006/0149323 A1* | 7/2006 | Merry ................ A61N 1/3904 607/5 |
| 2007/0063048 A1 | 3/2007 | Havens et al. |
| 2007/0101403 A1* | 5/2007 | Kubler ................ H04L 63/083 726/3 |
| 2008/0014867 A1* | 1/2008 | Finn ................... H04B 5/0062 455/41.1 |
| 2008/0168544 A1* | 7/2008 | von Krogh ........... G06F 21/445 726/6 |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2011/0246773 A1* | 10/2011 | Sidle .................. G06F 21/305 713/168 |
| 2011/0249394 A1* | 10/2011 | Nielsen ............... G06F 1/1635 361/679.41 |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Long et al. |
| 2014/0121445 A1 | 5/2014 | Fontenot et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0181955 A1* | 6/2014 | Rosati .................. G06F 21/44 726/18 |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0245021 A1* | 8/2014 | Nagai .................. H04L 63/0823 713/181 |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |

(56) References Cited

U.S. PATENT DOCUMENTS

| | | |
|---|---|---|
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0044964 A1* | 2/2015 | Khan ............... H04W 12/0605 |
| | | 455/41.1 |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0069130 A1 | 3/2015 | Gannon |
| 2015/0071818 A1 | 3/2015 | Scheuren et al. |
| 2015/0083800 A1 | 3/2015 | Li et al. |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0115035 A1 | 4/2015 | Meier et al. |
| 2015/0126110 A1* | 5/2015 | Ashley ............... H04W 4/80 |
| | | 455/41.1 |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161415 A1* | 6/2015 | Kreft ............... H04L 9/0643 |
| | | 713/194 |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0188891 A1* | 7/2015 | Grange ............... H04L 9/3242 |
| | | 380/270 |
| 2015/0193644 A1 | 7/2015 | Kearney et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0213433 A1* | 7/2015 | Khan ............... H04L 9/0844 |
| | | 705/71 |
| 2015/0220753 A1 | 8/2015 | Zhu et al. |
| 2015/0254485 A1 | 9/2015 | Feng et al. |
| 2015/0286252 A1* | 10/2015 | Barone ............... G07G 1/0018 |
| | | 710/304 |
| 2015/0303993 A1* | 10/2015 | Showering ........ H04B 5/0031 |
| | | 455/41.1 |
| 2015/0310243 A1 | 10/2015 | Ackley |
| 2015/0310389 A1 | 10/2015 | Crimm et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0048461 A1* | 2/2016 | Marinelli ............... G06F 21/80 |
| | | 713/193 |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Percorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |

(56) References Cited

U.S. PATENT DOCUMENTS

| | | |
|---|---|---|
| 2016/0227912 A1 | 8/2016 | Oberpriller et al. |
| 2016/0232891 A1 | 8/2016 | Pecorari |
| 2016/0239657 A1* | 8/2016 | Loughlin-McHugh ............... G06F 21/45 |
| 2016/0253660 A1* | 9/2016 | D'Alisa ............... G06Q 20/322 705/67 |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschinie et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0200108 A1 | 7/2017 | Au et al. |
| 2017/0200275 A1 | 7/2017 | McCloskey et al. |

OTHER PUBLICATIONS

Advisory Action (PTOL-303) dated May 19, 2017 for U.S. Appl. No. 14/695,923.

Final Rejection dated Feb. 8, 2017 for U.S. Appl. No. 14/695,923.

Final Rejection dated Jul. 26, 2018 for U.S. Appl. No. 14/695,923.

Non-Final Rejection dated Aug. 11, 2016 for U.S. Appl. No. 14/695,923.

Non-Final Rejection dated Jul. 3, 2017 for U.S. Appl. No. 14/695,923.

U.S. Patent Application for a Laser Scanning Module Employing an Elastomeric U-Hinge Based Laser Scanning Assembly, filed Feb. 7, 2012 (Feng et al.), U.S. Appl. No. 13/367,978.

U.S. Patent Application for Multifunction Point of Sale Apparatus With Optical Signature Capture filed Jul. 30, 2014 (Good et al.); 37 pages, U.S. Appl. No. 14/446,391.

U.S. Patent Application for Multipurpose Optical Reader, filed May 14, 2014 (Jovanovski et al.); 59 pages, U.S. Appl. No. 14/277,337.

U.S. Patent Application for Terminal Having Illumination and Focus Control filed May 21, 2014 (Liu et al.); 31 pages, U.S. Appl. No. 14/283,282.

U.S. Patent Application Reading Apparatus Having Partial Frame Operating Mode filed Apr. 11, 2014, (Deng et al.), U.S. Appl. No. 14/250,923.

Applicant Initiated Interview Summary (PTOL-413) dated Mar. 6, 2017 for U.S. Appl. No. 14/695,923.

* cited by examiner

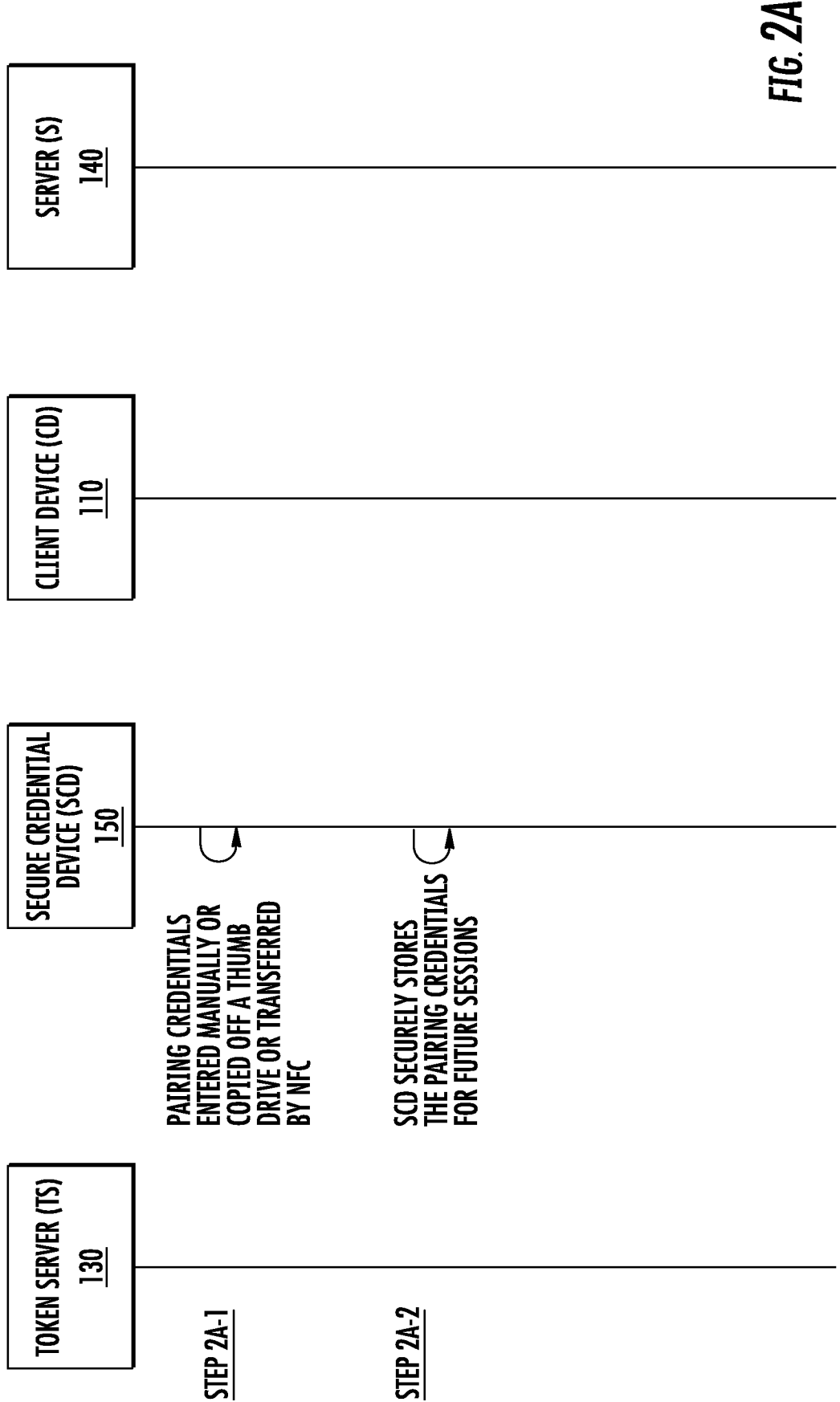

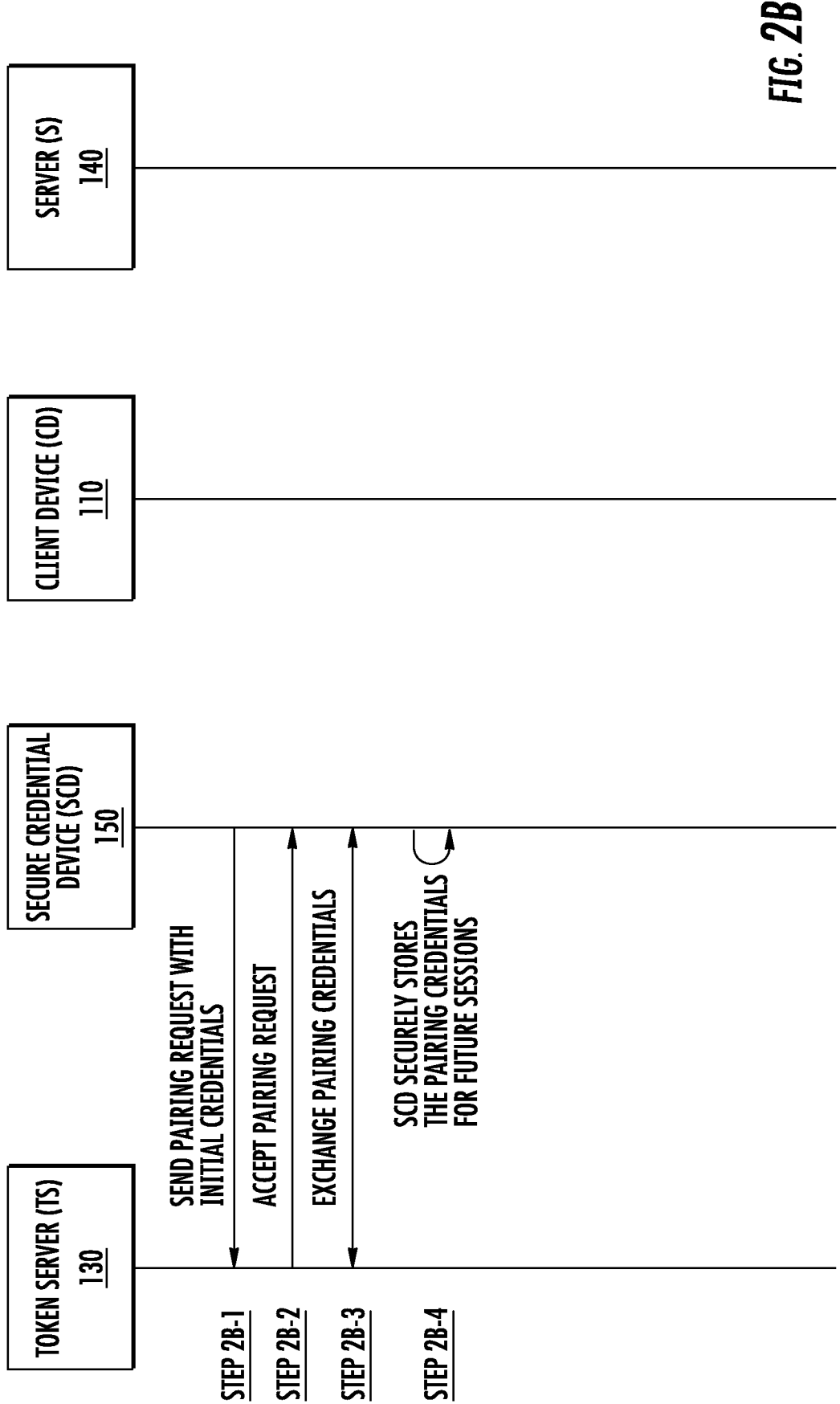

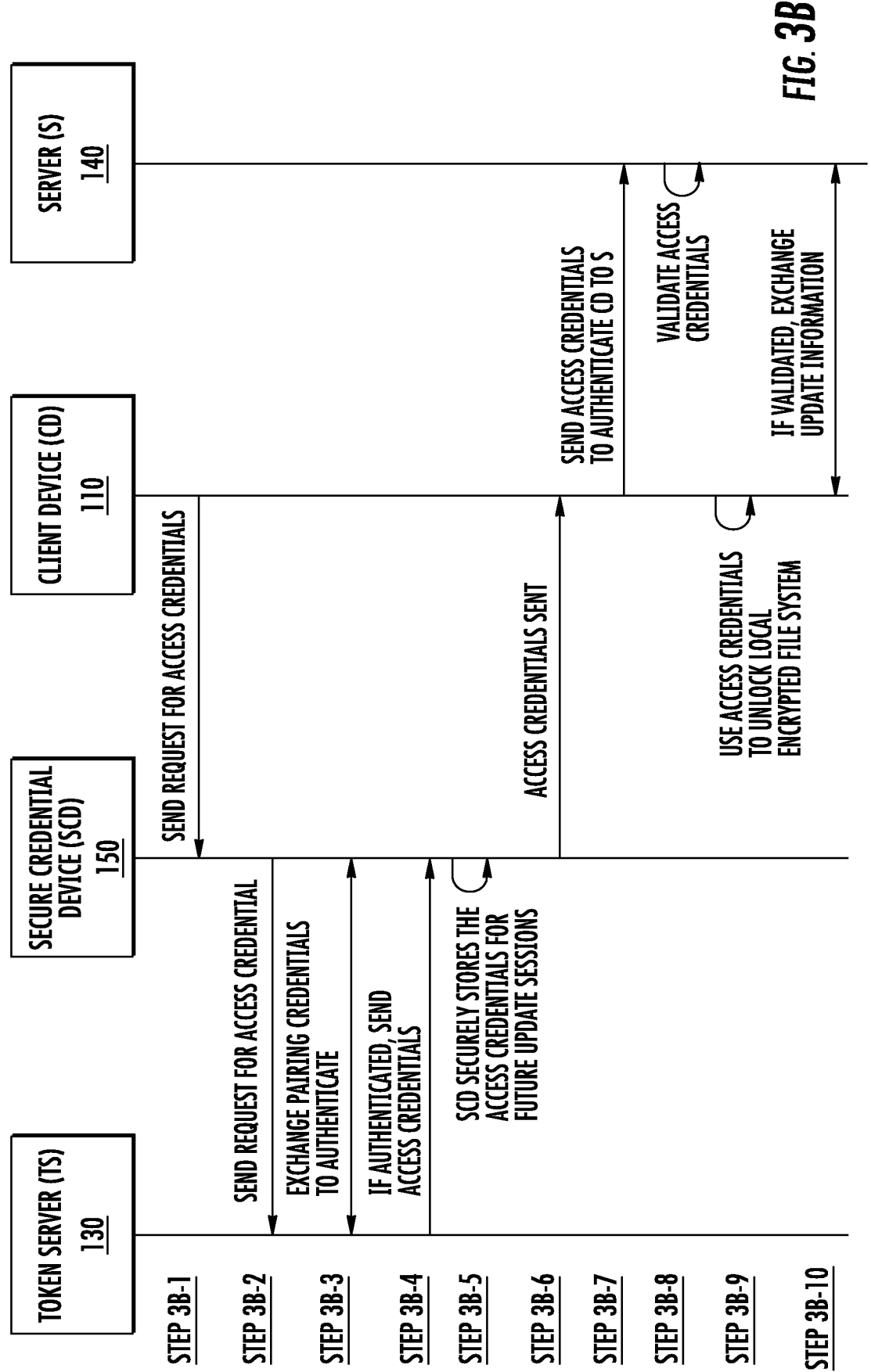

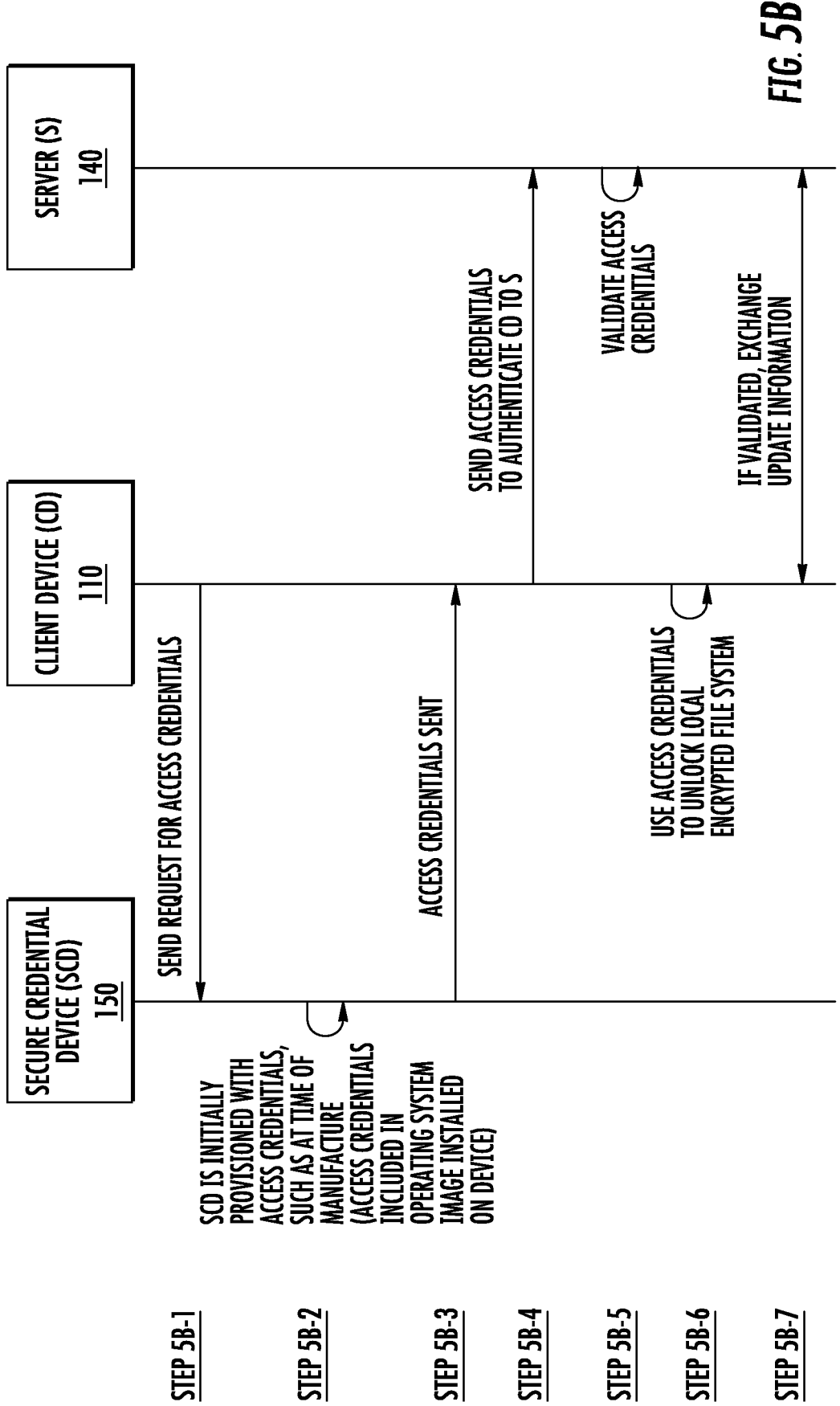

SECURE UNATTENDED NETWORK AUTHENTICATION

CROSS-REFERENCE TO RELATED APPLICATIONS

The present application claims the benefit of U.S. patent application Ser. No. 14/695,923, filed on Apr. 24, 2015 and published as U.S. Pub. No. 2016/0314294 on Oct. 27, 2016. The foregoing patent application and patent publication are each hereby incorporated by reference their entirety.

FIELD OF THE INVENTION

The present invention relates to secure network access by unattended client devices.

BACKGROUND

Technological advances have made possible an ever-increasing number of different hardware electronic devices designed for all kinds of tasks. Almost all of these client devices involve some firmware, operating system software, and/or applications and/or program codes that require occasional updates or configuration changes. Some client devices may involve data collection and data processing that requires an exchange of information with servers on a network.

Depending upon the nature of the tasks involved, strong security may be required for some client devices. Such strong security may include encryption for the data on the client devices (data at rest) and/or for the data exchanged by the client devices (data in communication). The credentials for strong security on the client devices typically require external information involving users of the client devices, such as passwords, PINs, smartcards, or biometrics. When client devices are unattended, the credentials are not available and therefore prevent the client devices from receiving updates and or exchanging information with servers on the network. This is especially true in cases where the credentials for network access are frequently changing, such as in high security environments.

Current solutions to this problem are either labor intensive or compromise security. For example, when smartcards are required for authentication, such as in Department of Defense (DoD) or other comparable government applications, client devices must be operated by users in order to conduct the routine updates and or exchange of information. This user involvement is costly and labor intensive. Solutions where the credentials are stored on the client devices are less labor intensive but defeat the purpose of the strong security, unless some kind of tamper detection or tamper resistance is employed.

Accordingly, there is a need for a system where unattended client devices can securely procure the credentials for secure network access.

SUMMARY

Accordingly, one embodiment of the present invention discloses a system where an unattended first device sends a request for access credentials to a second device; the second device then sends a request for access credentials to a third device, exchanges pairing credentials with the third device, and if authenticated, receives access credentials from the third device, and sends the access credentials to the first device; the first device then sends the access credentials to a fourth device, and if validated, exchanges information with the fourth device.

Another exemplary embodiment of the present invention discloses a system where an unattended first device sends a request for access credentials to a second device; the second device sends the access credentials to the first device; the first device then sends the access credentials to a third device, and if validated, exchanges information with the third device.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 2A and FIG. 2B are schematics outlining the initial provisioning of pairing credentials in accordance with embodiments of the disclosed subject matter.

FIG. 3A and FIG. 3B are schematics detailing the procurement of access credentials by an unattended client device in accordance with embodiments of the disclosed subject matter.

FIG. 5A and FIG. 5B are schematics outlining the procurement of access credentials by an unattended client device according to embodiments of the present invention.

DETAILED DESCRIPTION

The present invention embraces the concept of unattended devices procuring access credentials for network access and/or data encryption so that updates may be received from servers and/or information exchanged with servers in a manner that does not compromise security or increase labor overhead.

In the present disclosure, "unattended" refers to the fact that the client device is not operated by a user who has authenticated to the device (by password, PIN, smartcard, biometric, etc.) at the time that the client device procures the access credentials necessary to allow the device to exchange information with and/or receive updates from servers on a network. Unattended client devices may procure access credentials by timed or triggered means that are well understood in the art, i.e. client devices may procure the access credentials according to a regular time schedule or in response to some triggering event, such as a notification of new data to exchange or the availability of a new update.

Also, in the present disclosure, "pairing credentials" refer to those credentials which authenticate the client device to a token server, and "access credentials" refer to those credentials which authenticate the client device to a server and/or decrypt an encrypted file system on the client device. The "access credential" includes, but is not limited to, a one-time password, a symmetric key, a public key along with its private key, for instance using the public key cryptography standards (PKCS) certificate formats, or the like.

Further, in the present disclosure, "authentication credentials" refer to those credentials which authenticate the client device and the secure credential device.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Figure 1A:
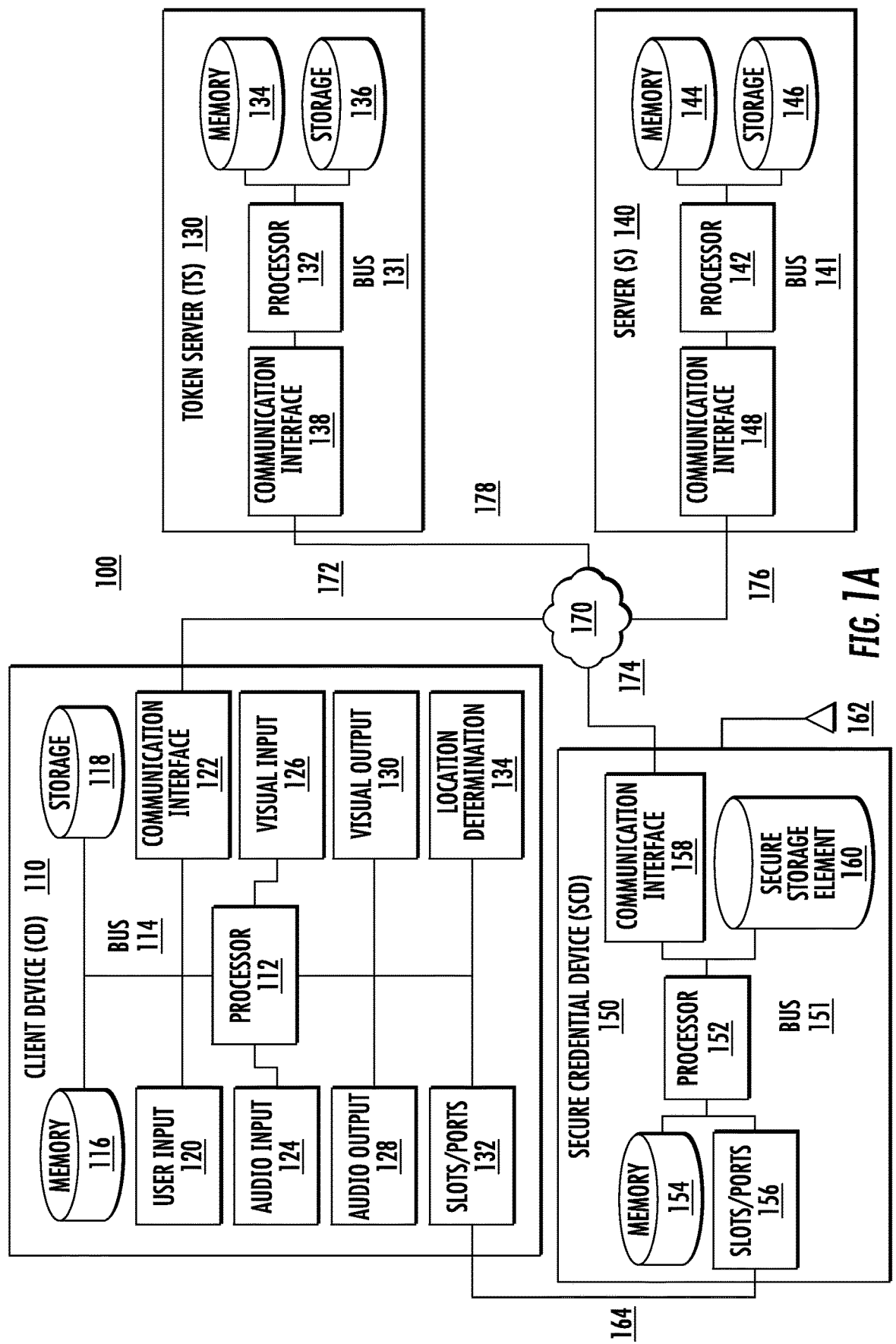
FIG. 1A and FIG. 1B are block diagrams of the hardware elements of the system in accordance embodiments of the disclosed subject matter.

FIG. 1A illustrates an exemplary system 100 for one embodiment of the present invention. In general, the system 100 includes a client device (CD) 110, a secure credential device (SCD) 150, a token server (TS) 130, and a server (S) 140. The client device 110, secure credential device 150, token server 130, and server 140 may be implemented in any form of digital computer or mobile device. Digital computers may include, but are not limited to, laptops, desktops, workstations, fixed vehicle computers, vehicle mount computers, hazardous environment computers, rugged mobile computers, servers, blade servers, mainframes, other appropriate computers. Mobile devices may include, but are not limited to, cellular telephones, smart phones, personal digital assistants, tablets, pagers, two-way radios, netbooks, barcode scanners, radio frequency identification (RFID) readers, intelligent sensors, tracking devices, and other similar computing devices.

In some embodiments of the present invention, the client device 110, secure credential device 150, token server 130, and server 140 are connected via a network 170. The network 170 may be any type of wide area network (WAN), such as the Internet, Local Area Network (LAN), or the like, or any combination thereof, and may include wired components, such as Ethernet, wireless components, such as LTE, Wi-Fi, Bluetooth, or near field communication (NFC), or both wired and wireless components, collectively represented by the data links 172, 174, 176, and 178.

Note that while token server 130 and server 140 are illustrated in FIG. 1A, FIG. 1B, FIG. 4A, and FIG. 4B as individual single servers, each may alternatively be distributed across multiple servers having the respective functionality of the token server 130 and server 140. And still in other embodiments, the token server 130 and server 140 may also be combined into one single server or distributed across multiple servers having the overall combined functionality of token server 130 and server 140.

In general, the server 140 includes at least one processor 142 and associated memory 144 and a communication interface 148, such as wired Ethernet or wireless such as Wi-Fi, Bluetooth or NFC. The server 140 may also include additional components such as a storage component 146. The components of server 140 may be interconnected using one or more buses 141 and may be mounted on a motherboard (not shown) or some other appropriate configuration.

Similarly, in general, the token server 130 includes at least one processor 132 and associated memory 134 and a communication interface 138, such as wired Ethernet or wireless such as Wi-Fi, Bluetooth or NFC. The token server 130 may also include additional components such as a storage component 136. The components of token server 130 may be interconnected using one or more buses 131 and may be mounted on a motherboard (not shown) or some other appropriate configuration.

Further, in general, the secure credential device 150 includes at least one processor 152 and associated memory 154 and a communication interface 158, such as wired Ethernet or wireless such as Wi-Fi, Bluetooth or NFC. The secure credential device 150 may also include additional components such as a secure storage element 160 and slots/ports 156. The components of the secure credential device 150 may be interconnected using one or more buses 151 and may be mounted on a motherboard (not shown) or some other appropriate configuration. The secured credential device 150 has a wired communication channel 164 connecting it to the client device 110. The wired communication channel 164 may be USB, I$^2$C, or other computer bus. In one embodiment, the wired communication channel 164 between the secure credential device 150 and the client device 110 can be protected by authentication; in this embodiment, the client device 110 stores the authentication credentials in the secure storage element 160 during an initial provisioning process that occurs while the client device 110 is still authenticated with a user. The secure credential device is also fixed in location 162, meaning that it is non-moveable.

The secure credential device 150 is built for tamper detection, tamper resistance, or both. In some embodiments, just specific components of the secure credential device 150 may be built for tamper detection, tamper resistance, or both, such as the secure storage element 160. Tamper detection methods include, but are not limited to, detection of ultraviolet fluorescent chemicals, detection of varying temperature, detection of varying clocking information, detection of varying voltage, and detection of varying electrical signals. Tamper resistance methods include, but are not limited to, the use of a potted material which would destroy one or more components of the secure credential device 150, such as the secure storage element 160, upon removal. Other tamper detection and tamper resistant methods are understood in the art and may be employed herein. In some embodiments, the secure credential device would report the detected tampering and might cause temporary or permanent disablement of the secure credential device. In yet other embodiments, where the secure storage element 160 of the secure credential device 150 implements tamper control that is acceptable and the communication interface 158 is wireless, the secure credential device 150 may further be designed to meet FIPS-140-2 by layering a protocol on top of the base wireless that uses validated encryption algorithms such as Advanced Encryption Standard (AES). In these embodiments, additional wireless encryption pairing credentials would be required between the secure credential device 150 and token server 130 to derive a link key for the validated encryption algorithm.

In one embodiment, the secure credential device 150 would be a dock for the client device 110. The dock would have the ability to cache access credentials and would include one or more mechanisms for providing user level authentication, including but not limited to: a common access card (CAC) reader, a touchscreen, a keypad, and a display for password entry. The dock further provides the recharging of the battery and ensures the essential constant power supply to the client device 110 during critical software and firmware updates.

In general, the client device 110 includes a processor 112 and associated memory 116 as well as a communication interface 122, such as wired Ethernet or wireless such as Wi-Fi, Bluetooth, or NFC. The client device 110 may include additional components such as a storage component 118 such as a hard drive or solid state drive, a location determination component 134 such as a Global Positioning System (GPS) chip, audio input component 124 such as a microphone, audio output component 128 such as a speaker, visual input component 126 such as a camera or barcode reader, visual output component 130 such as a display, and a user input component 120 such as a touchscreen, navigation shuttle, soft keys, or the like, and slots/ports 132 which may be used for smart card readers or for wired connections 164 with the secure credential device 150 over USB, I2C, or computer bus. The components of client device 110 may be interconnected using one or more buses 114 and may be mounted on a motherboard (not shown) or some other appropriate configuration.

Figure 1B:
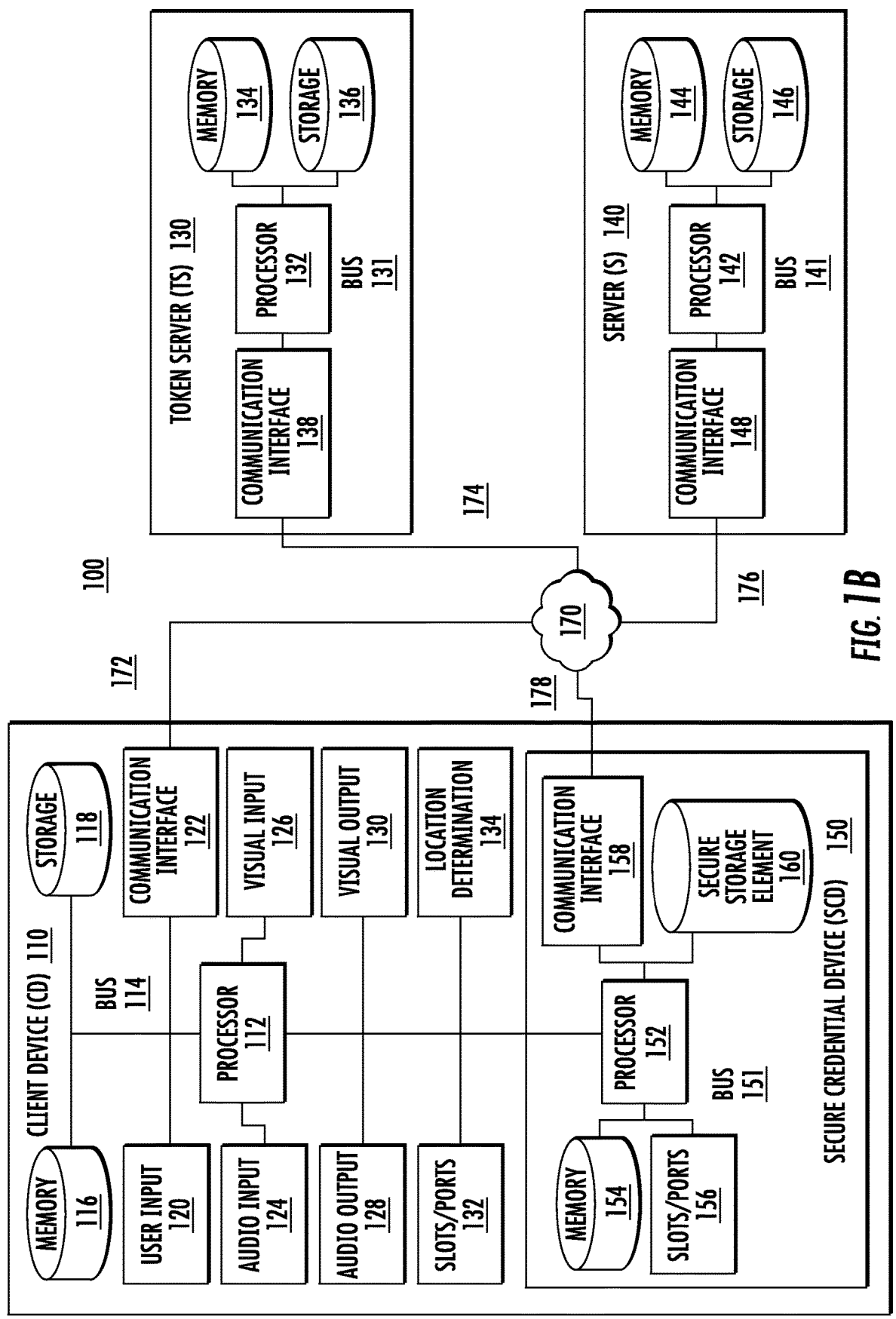

FIG. 1B illustrates another embodiment of the present invention. The embodiment in FIG. 1B is similar to FIG. 1A with the exception that in FIG. 1B, the secure credential device 150 is internal to the client device 110. While FIG. 1B illustrates separate components for the client device 110 and secure credential device 150, in an alternative embodiment, the comparable components from the client device 110 and secure credential device 150 could be the same, i.e. processor 112 and 152, memory 116 and 154, communication interface 122 and 158, and communication link 172 and 178, and there may not be a need for slots/ports 132 and 156, since bus 114 and 151 may be the same. In some embodiments, the storage 118 and secure storage element 160 could also be the same, provided that the combination of the secure credential device 150 and client device 110 still allow for tamper detection, tamper resistance, or both.

FIG. 2A illustrates one embodiment of the present invention where the token server pairing credentials are initially provisioned on the secure credential device 150 using out of band means. In Step 2A-1, the pairing credentials are provisioned on the secure credential device 150 by a user who manually enters the credentials, copies them from a thumb drive or flash drive, or transfers them using NFC. In Step 2A-2, the secure credential device 150 then securely stores the pairing credentials in the secure storage element 160 for use in future sessions.

FIG. 2B illustrates an alternative embodiment of the present invention where the token server pairing credentials are initially provisioned on the secure credential device by pairing with the token server 130. In step 2B-1, the secure credential device 150 sends a pairing request with initial credentials to the token server 130. In step 2B-2, the token server 130 accepts the pairing request, and in step 2B-3, the token server and secure credential device exchange pairing credentials (i.e. the pairing key). In step 2B-4, the secure credential device then stores the pairing credentials for use in future sessions.

Figure 3A:
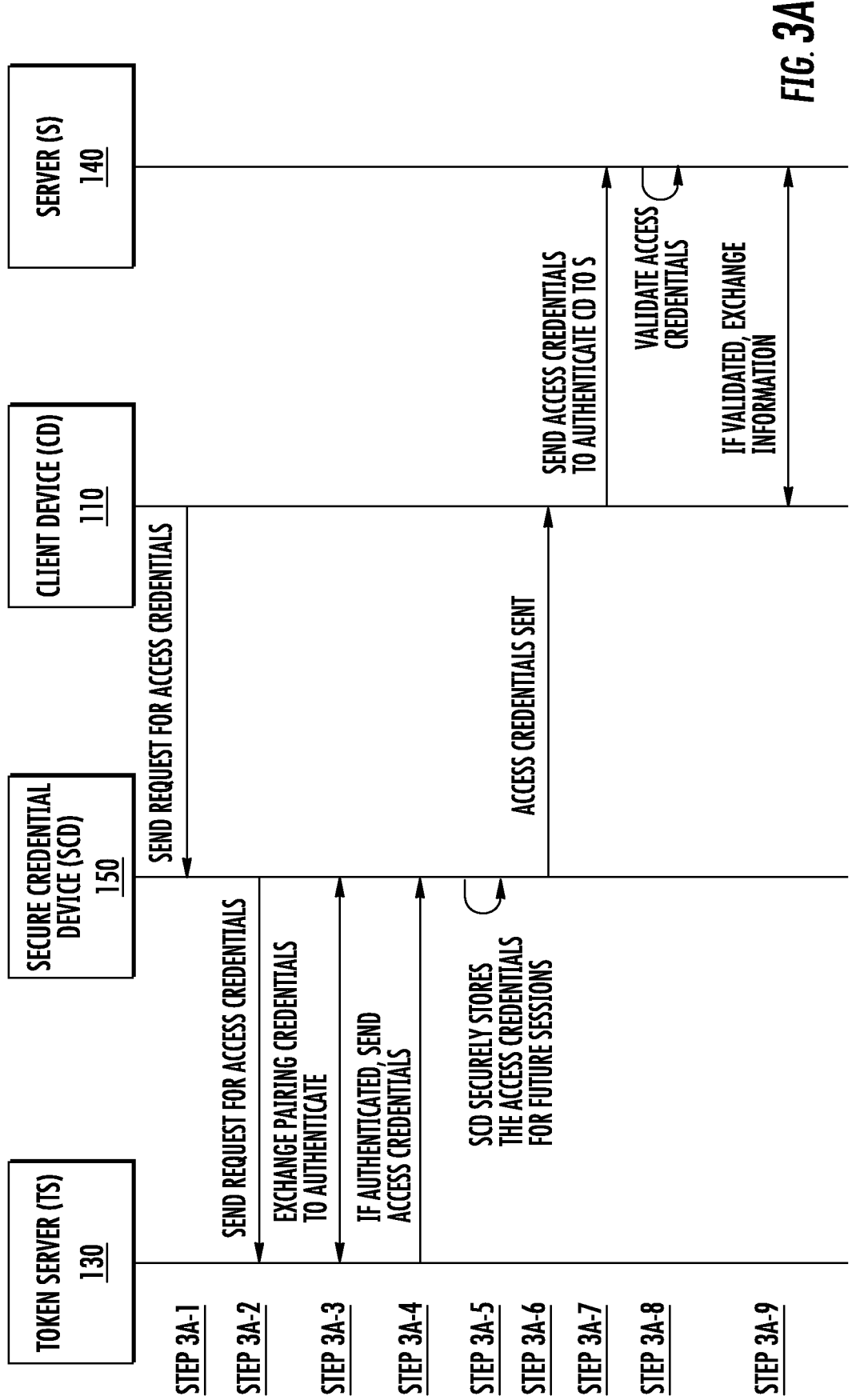

FIG. 3A illustrates the communication flow between the elements of system 100 of FIGS. 1A and 1B where the client device 110 procures access credentials from the token server 130 through the secure credential device 150 for accessing server 140. In step 3A-1, the client device 110 sends a request for the access credentials to the secure credential device 150. In step 3A-2, the secure credential device 150 sends a request for the access credentials to the token server 130. The secure credential device 150 and token sever 130 exchange pairing credentials to authenticate (Step 3A-3), and if authenticated (Step 3A-4), the token server 130 sends the access credentials to the secure credential device 150. In step 3A-5, the secure credential device 150 then stores the access credentials for use in a future session. In other embodiments, the secure credential device 150 does not store the access credentials but obtains them from the token server 130 each time the client device 110 needs to access the server 140, such as might be required in highly secure environments when the access credentials may be changing with greater frequency. In step 3A-6, the secure credential device 150 then sends the access credentials to the client device 110, which then sends them to the server 140 (Step 3A-7). If the server validates the access credentials (Step 3A-8), then the client device 110 and server 140 exchange information (Step 3A-9). The information exchanged includes, but is not limited to, firmware updates, operating system updates, application and/or program code updates, configuration setting changes, and customer data exchange.

FIG. 3B illustrates another embodiment of the present invention. The embodiment in FIG. 3B is similar to FIG. 3A with the exception that in FIG. 3B, there is the added step 3B-9 where the access credentials are used to unlock the local encrypted file system on the client device 110 so that information may be exchanged with server 140.

Figure 4A:
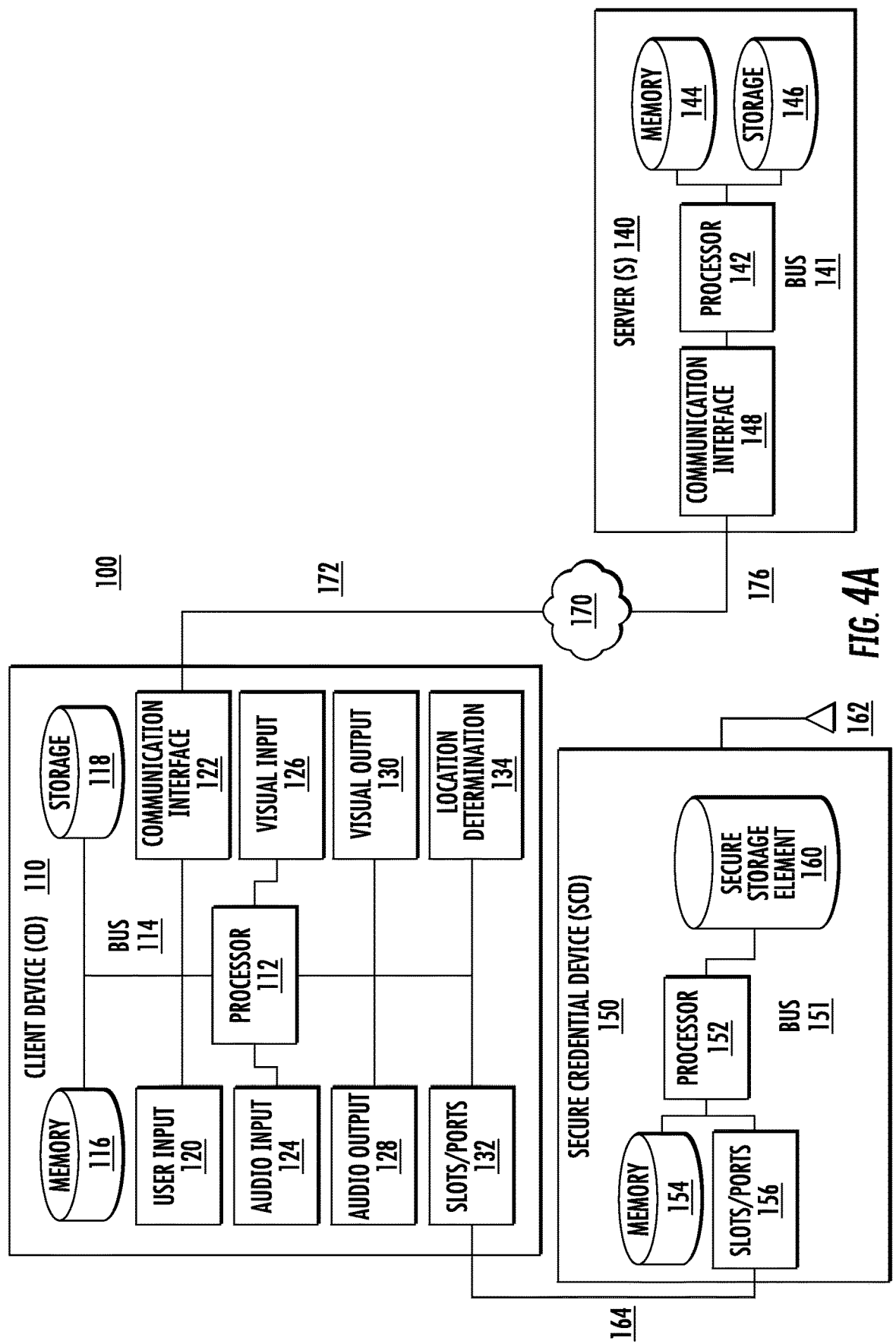
FIG. 4A and FIG. 4B are block diagrams of the hardware elements of the system according to embodiments of the present invention.

FIG. 4A illustrates yet another embodiment of the present invention. In this embodiment, the secure credential device 150 is external to the client device 110 but does not contain a communication interface for communicating with the token server 130 as in FIG. 1A. Because the secure credential device cannot communicate with the token server 130, it must be initially provisioned with the access credentials, such as at the time of manufacture where the access credentials would be included in the operating system image installed on the secure credential device.

Figure 4B:
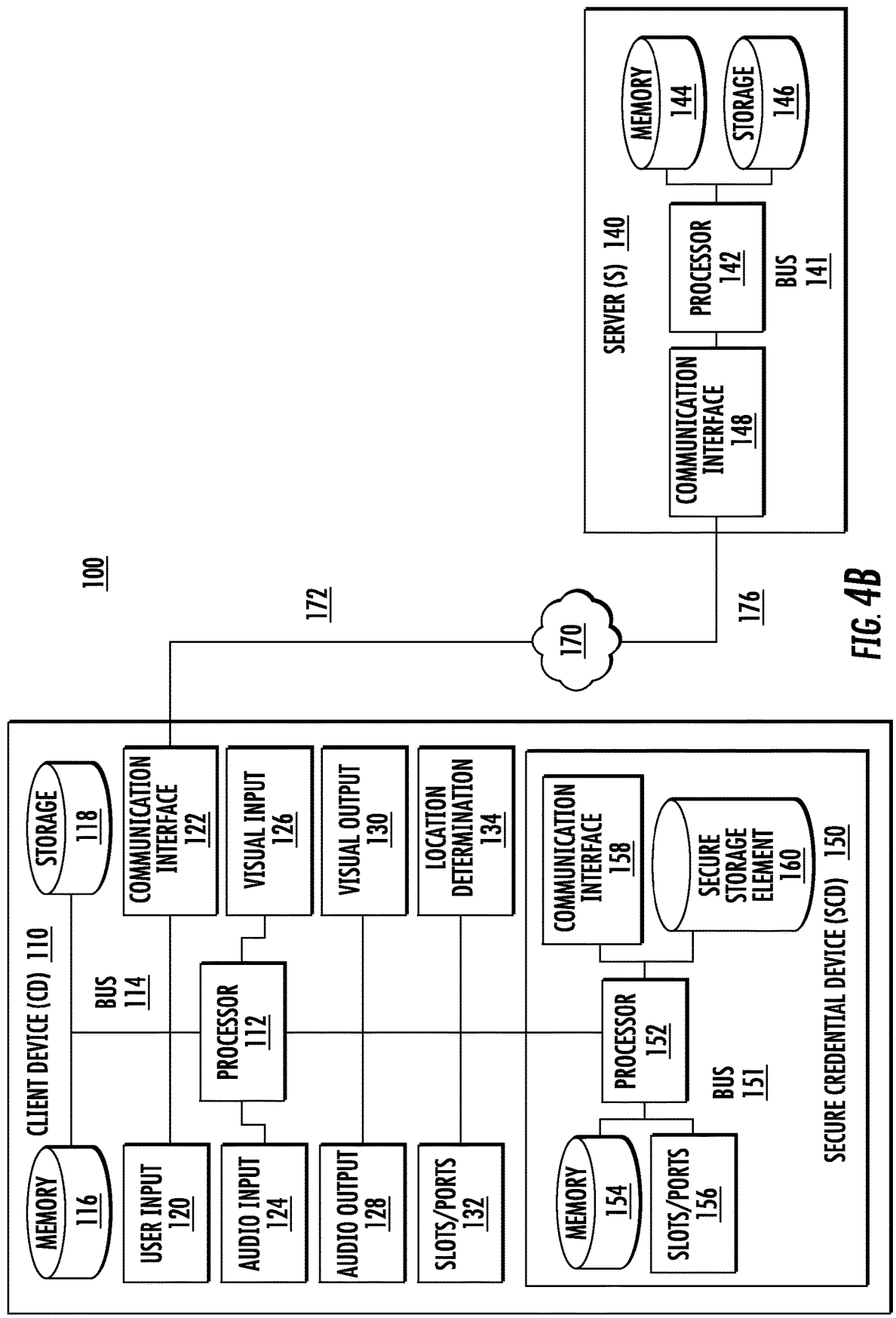

FIG. 4B illustrates another embodiment of the present invention. In this embodiment, the secure credential device 150 is internal to the client device 110. While FIG. 4B illustrates separate components for the client device 110 and secure credential device 150, in an alternative embodiment, the comparable components could be the same, i.e. processor 112 and 152, and memory 116 and 154, and there may not be a need for slots/ports 132 and 156, since bus 114 and 151 may be the same. In some embodiments, the storage 118 and secure storage element 160 could also be the same, provided that the combination of the secure credential device 150 and client device 110 still allow for tamper detection, tamper resistance, or both.

Figure 5A:
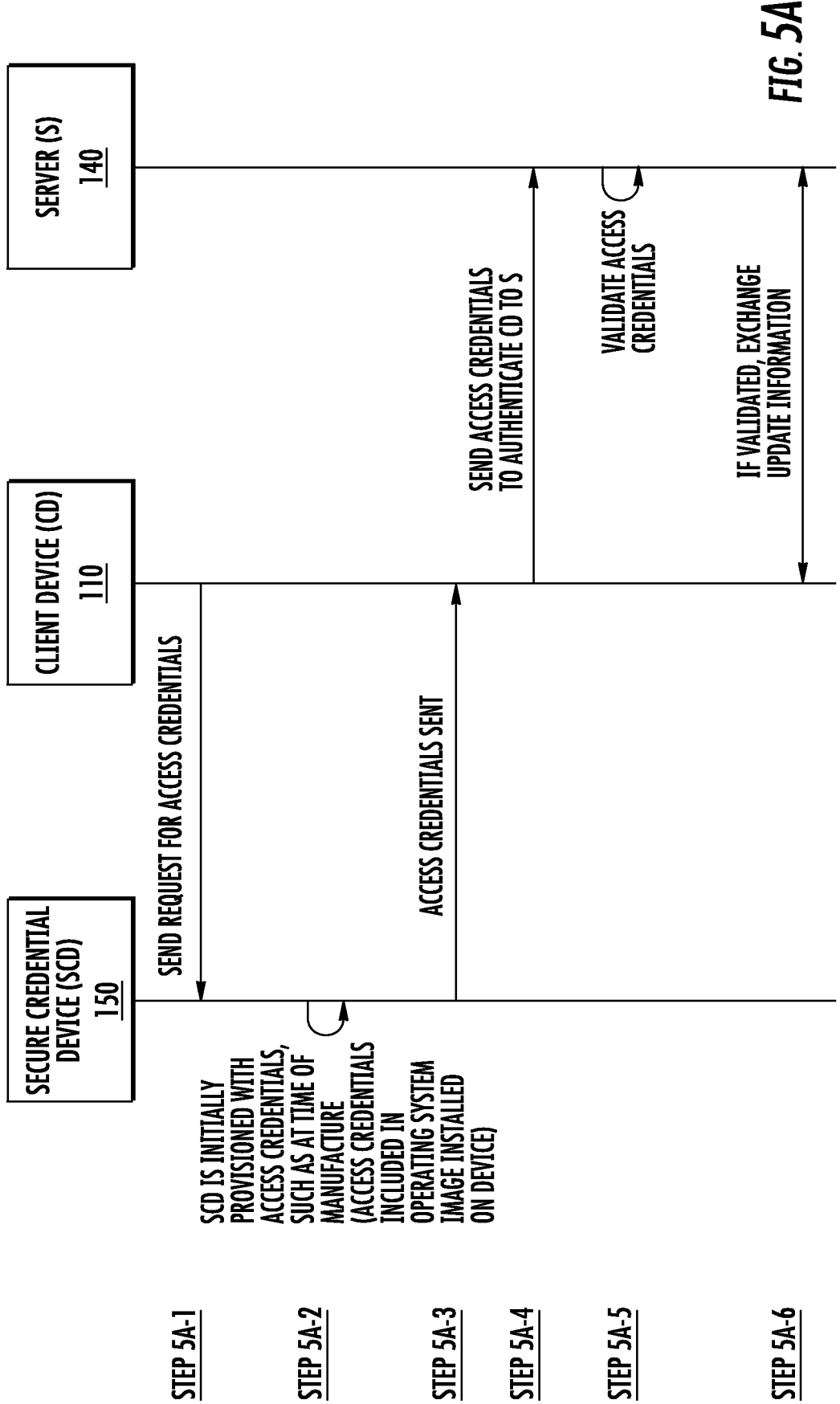

FIG. 5A illustrates the communication flow between the elements of system 100 of FIGS. 4A and 4B where the client device 110 procures access credentials from the secure credential device 150 for accessing server 140. In step 5A-1, the client device 110 sends a request for access credentials to the secure credential device 150. Because the secure credential device 150 has already been provisioned with the access credentials at time of manufacture (Step 5A-2), then the secure credential device 150 can just send the access credentials to the client device 110 (Step 5A-3) which then sends them to the server 140 (Step 5A-4). If the access credentials are validated (Step 5A-5), then the client device 110 and server 140 exchange information (Step 5A-6). As before, the information exchanged includes, but is not limited to, firmware updates, operating system updates, application and/or program code updates, configuration setting changes, and customer data exchange. In some embodiments, the secure credential device 150 could be equivalent to a smartcard that could be used to perform the symmetric or private key encryption.

FIG. 5B illustrates another embodiment of the present invention. The embodiment in FIG. 5B is similar to FIG. 5A with the exception that in FIG. 5B, there is the added step 5B-6 where the access credentials are used to unlock the local encrypted file system on the client device 110 so that information may be exchanged with server 140.

Several implementations have been described herein. However, it will be understood that various modifications may be made without departing from the spirit and scope of the invention.

Additionally, the communication flows in the schematics of the figures do not require the particular order shown or sequential order to achieve the specified results. Further, other steps may be provided or eliminated from the schematics and other components may be added to or removed from the described systems. These other implementations are within the scope of the claims.

The following represent exemplary embodiments of the present disclosure.

A1. A system, comprising:
  an unattended first device comprising:
  a first communication interface;
  a first control system communicatively coupled to the first communication interface and comprising at least one first hardware processor and a first memory storing program codes operable to:
    send a request to the second device for access credentials;
    receive the access credentials;
    send the access credentials to the fourth device; and
    if the access credentials is validated,
  exchange information with the fourth device.
  a second device comprising:
  a second communication interface;
  a second secured storage element;
  a second control system communicatively coupled to the second communication interface and comprising at least one second hardware processor and a second memory storing program codes operable to:
    receive a request for the access credentials from the first device;
    send a request for the access credentials to the third device;
    exchange pairing credentials with the third device to authenticate with the third device;
    if authenticated with the third device, receive the access credentials; and
    send the access credentials to the first device;
  a third device comprising:
  a third communication interface;
  a third control system communicatively coupled to the third communication interface and comprising at least one third hardware processor and a third memory storing program codes operable to:
    receive a request for the access credentials from the second device;
    exchange pairing credentials with the second device to authenticate with the second device;
    if authenticated with the second device, send the access credentials to the second device; and
  a fourth device comprising:
  a fourth communication interface;
  a fourth control system communicatively coupled to the fourth communication interface and comprising at least one fourth hardware processor and a fourth memory storing program codes operable to:
    receive access credentials from the first device;
    validate the access credentials; and
    if validated, exchange information with the first device.

A2. The system of embodiment A1, wherein the second device is internal to the first device.

A3. The system of embodiment A1, further comprising the first device using the access credentials to decrypt an encrypted file system.

A4. The system of embodiment A1, wherein the information exchanged between the fourth device and the first device comprises one of the group consisting of: information to update software on the first device, information to update firmware on the first device, information to update applications on the first device, information to update program codes on the first device, information to make configuration setting changes on the first device, information to update the operating system on the first device, and information pertaining to customer data.

A5. The system of embodiment A1, wherein the pairing credentials stored in the second device are stored in a tamper resistant manner.

A6. The system of embodiment A5, wherein the tamper resistant manner comprises use of potted material which would destroy one or more components of the second device upon removal.

A7. The system of embodiment A1, wherein the pairing credentials stored in the second device are stored in a manner to provide for tamper detection.

A8. The system of embodiment A7, wherein the manner to provide for tamper detection comprises one of the group consisting of: detection of ultraviolet fluorescent chemicals, detection of varying temperature, detection of varying clocking information, detection of varying voltage, and detection of varying electrical signals.

A9. The system of embodiment A7, wherein the second device, upon tamper detection, is further operable to:
  report the detected tampering; and
  disable one or more components of the second device.

A10. The system of embodiment A1, wherein the pairing credentials are stored according to National Institute of Standards and Technology (NIST) standards.

A11. The system of embodiment A1, wherein the pairing credentials exchanged between the second and third device are exchanged by out-of-band means.

A12. The system of embodiment A11, wherein the out-of-band means comprises one of the group consisting of: direct user input at the second and third devices, use of a thumb drive at the second and third devices, use of a universal serial bus (USB) cable between the second and third device, or use of wired Ethernet cable between the second and third device.

A13. The system of embodiment A1, wherein the pairing credentials exchanged between the second and third device are exchanged by use of a wireless communication channel.

A14. The system of embodiment A13, wherein the wireless communication channel comprises one of the group consisting of: Bluetooth and a near field communication (NFC).

A15. The system of embodiment A14, wherein the wireless communication channel is secured with an encryption algorithm.

A16. The system of embodiment A1, wherein the second device is a dock for the first device with at least one mechanism for providing user level authentication, wherein the mechanism for providing user level authentication is selected from the group consisting of: a common access card (CAC) reader, a touchscreen, a keypad, and a display for password entry.

A17. The system of embodiment A1, wherein the access credentials comprise one of a group consisting of: a one-time password, a symmetric key, a public key along with its private key, and a public key cryptography standard (PKCS) certificate.

A18. The system of embodiment A1, wherein the second device is further operable to:
  send a pairing request with initial credentials to the third device;
  receive an acceptance of the pairing request form the third device; and
  exchange pairing credentials with the third device.

A19. The system of embodiment A1, wherein the third device is further operable to:

receive a pairing request with initial credentials from the second device;

send an acceptance of the pairing request to the second device; and exchange pairing credentials with the second device.

A20. The system of embodiment A1, wherein the second device is further operable to:

store the access credentials.

A21. The system of embodiment A20, wherein the access credentials are stored in a tamper resistant manner.

A22. The system of embodiment A21, wherein the tamper resistant manner comprises use of potted material which would destroy one or more components of the second device upon removal.

A23. The system of embodiment A20, wherein the access credentials are stored in a manner to provide for tamper detection.

A24. The system of embodiment A23, wherein the manner to provide for tamper detection comprises: detection of ultraviolet fluorescent chemicals, detection of varying temperature, detection of varying clocking information, detection of varying voltage, and detection of varying electrical signals.

A25. The system of embodiment A23, wherein the second device, upon tamper detection, is further operable to:

report the detected tampering; and disable one or more components of the second device.

B26. A system, comprising:

an unattended first device comprising:

a first communication interface;

a first control system communicatively coupled to the first communication interface and comprising at least one first hardware processor and a first memory storing program codes operable to:

send a request to the second device for access credentials;

receive the access credentials;

send the access credentials to the third device; and if the access credentials are validated, exchange information with the third device.

a second device comprising:

a second communication interface;

a second secured storage element;

a second control system communicatively coupled to the second communication interface and comprising at least one second hardware processor and a second memory storing program codes operable to:

receive a request for the access credentials from the first device; and send the access credentials to the first device; and a third device comprising:

a third communication interface;

a third control system communicatively coupled to the third communication interface and comprising at least one third hardware processor and a third memory storing program codes operable to:

receive the access credentials from the first device;

validate the access credentials; and if validated, exchange information with the first device.

B27. The system of embodiment B26, wherein the second device is internal to the first device.

B28. The system of embodiment B26, further comprising the first device using the access credentials to decrypt an encrypted file system.

B29. The system of embodiment B26, wherein the information exchanged between the third device and the first device comprises one of the group consisting of: information to update software on the first device, information to update firmware on the first device, information to update applications on the first device, information to update program codes on the first device, information to make configuration setting changes on the first device, information to update the operating system on the first device, and information pertaining to customer data.

B30. The system of embodiment B26, wherein the second device stores the access credentials in a tamper resistant manner.

B31. The system of embodiment B30, wherein the tamper resistant manner comprises use of potted material which would destroy one or more components of the second device upon removal.

B32. The system of embodiment B30, wherein the second device stores the access credentials in a manner to provide for tamper detection.

B33. The system of embodiment B32, wherein the manner to provide for tamper detection comprises: detection of ultraviolet fluorescent chemicals, detection of varying temperature, detection of varying clocking information, detection of varying voltage, and detection of varying electrical signals.

B34. The system of embodiment B32, wherein the second device, upon tamper detection, is further operable to:

report the detected tampering; and disable one or more components of the second device.

B35. The system of embodiment B26, wherein the second device stores the access credentials according to NIST standards.

B36. The system of embodiment B26, wherein the access credentials comprise one of a group consisting of: a one-time password, a symmetric key, a public key along with its private key, and a PKCS certificate format.

B37. The system of embodiment B26, wherein the second device is initially provisioned with the access credentials.

B38. The system of embodiment 37, wherein the initial provisioning comprises the inclusion of the access credentials in the operating system image installed on the second device.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;

U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; U.S. Pat. No. D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,526;
U.S. Pat. Nos. 8,798,367; 8,807,431;
U.S. Pat. Nos. 8,807,432; 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;

U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);
U.S. patent application Ser. No. 14/087,190 for Optimal Range Indicators for Bar Code Validation, filed Nov. 22, 2013 (Hejl);
U.S. patent application Ser. No. 14/094,087 for Method and System for Communicating Information in an Digital Signal, filed Dec. 2, 2013 (Peake et al.);
U.S. patent application Ser. No. 14/101,965 for High Dynamic-Range Indicia Reading System, filed Dec. 10, 2013 (Xian);
U.S. patent application Ser. No. 14/150,393 for Indicia-reader Having Unitary Construction Scanner, filed Jan. 8, 2014 (Colavito et al.);
U.S. patent application Ser. No. 14/154,207 for Laser Barcode Scanner, filed Jan. 14, 2014 (Hou et al.);
U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTON CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method of authenticating a client device to a server, the method comprising:
    receiving, at a secure credential device, a request for an access credential from the client device over a first communication channel,
        wherein the secure credential device comprises one or more tamper detection features or tamper resistant features;
        wherein the client device is plugged into the secure credential device,
        wherein the access credential is configured to facilitate authentication of the client device to the server to exchange information with the server, and
        wherein the secure credential device comprises a second communication channel configured to communicatively couple the secure credential device to a remote token server via a wide area network;
    sending the request for the access credential from the secure credential device to the remote token server using the second communication channel;
    exchanging a pairing credential between the secure credential device and the remote token server, wherein the pairing credential is configured to authenticate the secure credential device to the remote token server;
    in response to the remote token server authenticating the secure credential device, automatically receiving the access credential from the remote token server at the secure credential device, wherein the remote token server generates the access credential each time the client device initiates communication with the server;
    in response to the secure credential device receiving the access credential, sending the access credential from the secure credential device to the client device over the first communication channel;
    sending the access credential to the server for validation, the server comprising a server communication interface configured to communicatively couple the client device and the server; and
    in response to the server validating the access credential, exchanging information between the client device and the server using the server communication interface.

2. The method of claim 1, wherein the client device comprises a mobile device.

3. The method of claim 1, wherein the secure credential device comprises a docking station for the client device.

4. The method of claim 1, wherein receiving, at the secure credential device, the request for the access credential takes place when the client device and the secure credential device are unattended.

5. The method of claim 1, wherein sending the access credential to the server takes place when the client device and the secure credential device are unattended.

6. The method of claim 1, wherein exchanging information between the client device and the server takes place when the client device and the secure credential device are unattended.

7. The method of claim 1, further comprising storing the access credential in memory housed in the secure credential device for future use.

8. The method of claim 1, wherein the access credential is initially provisioned in memory housed in the secure credential device.

9. The method of claim 1, wherein the secure credential device is fixed in location or non-moveable.

10. The method of claim 1, wherein the one or more tamper detection features comprises features configured to detect one or more of: ultraviolet fluorescent chemicals, varying temperature, varying clocking information, varying voltage, and varying electrical signals.

11. The method of claim 1, wherein the one or more tamper resistant features comprises a potted material configured to destroy one or more components of the secure credential device.

12. The method of claim 1, wherein exchanging information between the client device and the server comprises exchanging customer data between the client device and the server.

13. The method of claim 1, wherein exchanging information between the client device and the server comprises the client device receiving an update from the server.

14. A method of authenticating a mobile device to a remote server, the method comprising:
    receiving a first request for an access credential from the mobile device via a secure credential device, the secure credential device comprising a first communication interface configured to communicatively couple the mobile device and the secure credential device and a second communication interface configured to communicatively couple the secure credential device and a remote token server via a wide area network,
        wherein the secure credential device comprises one or more tamper detection features or tamper resistant features;
        wherein the access credential is configured to facilitate authentication of the mobile device to the remote server to exchange information with the remote server, and
        wherein the secure credential device is internal to the mobile device;
    sending a second request for the access credential from the secure credential device to the remote token server using the second communication interface;
    exchanging a pairing credential between the secure credential device and the remote token server, wherein the pairing credential is configured to authenticate the secure credential device to the remote token server;
    in response to the remote token server authenticating the secure credential device, automatically receiving the access credential from the remote token server at the secure credential device, wherein the remote token server generates the access credential each time the mobile device initiates communication with the remote server using the second communication interface;
    sending the access credential from the secure credential device to the mobile device using the first communication interface;
        wherein the remote server comprises a third communication interface configured to communicatively couple the mobile device and the remote server, and wherein the mobile device is configured to send the access credential to the remote server for validation using the third communication interface; and in response to the remote server validating the access credential, exchanging information between the remote server and the mobile device using the third communication interface, the information comprising customer data and updates.

15. The method of claim 14, wherein one or more of: receiving the first request for the access credential from the mobile device, sending the second request for the access credential from the secure credential device to the remote token server, exchanging the pairing credential between the secure credential device and the remote token server, receiving the access credential from the remote token server at the secure credential device and sending the access credential from the secure credential device to the mobile device, takes place when the mobile device and the secure credential device are unattended.

16. The method of claim 14, wherein exchanging information between the remote server and the mobile device takes place when the mobile device and the secure credential device are unattended.

17. A system for authenticating a mobile device to a remote server, the system comprising:
- a secure credential device in communication with the mobile device, the secure credential device comprising a first communication interface configured to communicatively couple the mobile device and the secure credential device, wherein the secure credential device is configured to receive a first request for an access credential from the mobile device using the first communication interface, the access credential is configured to facilitate authentication of the mobile device to a remote server to exchange information with the remote server when the mobile device is unattended;
- wherein the secure credential device comprises one or more tamper detection features or tamper resistant features;
- a remote token server configured to provide the access credential to the secure credential device, the secure credential device comprising a second communication interface configured to communicatively couple the secure credential device and the remote token server via a wide area network,
  wherein the secure credential device is configured to send a second request for the access credential to the remote token server using the second communication interface, wherein to receive the access credential from the remote token server using the second communication interface, the remote token server and the secure credential device are configured to exchange a pairing credential to authenticate the secure credential device, wherein the remote token server is configured to:
   generate the access credential each time the mobile device initiates communication with the remote server; and
   send the access credential to the secure credential device when the remote token server authenticates the secure credential device, and wherein the secure credential device is configured to send the access credential to the mobile device using the first communication interface after having received the access credential from the remote token server; and the remote server, wherein
   the remote server is configured to exchange information with the mobile device when the mobile device is unattended,
   the remote server comprises a third communication interface configured to communicatively couple the mobile device and the remote server, wherein the mobile device is configured to send the access credential to the remote server using the third communication interface when the mobile device is unattended, the mobile device having received the access credential from the secure credential device, wherein the remote server and the mobile device are configured to exchange information using the third communication interface when the mobile device is unattended and in response to the remote server validating the access credential, and wherein the information comprises customer data and updates.

18. The system of claim 17, wherein the secure credential device further comprises a memory for storing the access credential for future use.

19. The system of claim 18, wherein exchanging information between the client device and the remote server comprises the mobile device receiving an update from the remote server.

* * * * *